US012761698B2

(12) United States Patent
Paavola et al.

(10) Patent No.: US 12,761,698 B2
(45) Date of Patent: Oct. 13, 2026

(54) KEYBOARD SWITCH DESIGN FOR ULTRATHIN COMPUTING DEVICES

(71) Applicant: Intel Corporation, Santa Clara, CA (US)

(72) Inventors: Juha T. Paavola, Hillsboro, OR (US); Sami M. Heinisuo, Dallas, OR (US); Kari Pekka Johannes Mansukoski, Hillsboro, CA (US); Shawn S. McEuen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 477 days.

(21) Appl. No.: 18/344,061

(22) Filed: Jun. 29, 2023

(65) Prior Publication Data

US 2025/0004505 A1 Jan. 2, 2025

(51) Int. Cl.

| | |
|---|---|
| ***G06F 1/16*** | (2006.01) |
| ***H01H 13/7073*** | (2006.01) |
| ***H01H 13/785*** | (2006.01) |
| ***H05K 5/00*** | (2025.01) |
| ***H05K 7/00*** | (2006.01) |

(52) U.S. Cl.

CPC ....... *G06F 1/1662* (2013.01); *H01H 13/7073* (2013.01); *H01H 13/785* (2013.01)

(58) Field of Classification Search

CPC .... G06F 1/1662; G06F 1/1664; G06F 1/1666; G06F 1/1667; G06F 1/1671; H01H 13/7073; H01H 13/785

See application file for complete search history.

(56) References Cited

U.S. PATENT DOCUMENTS

| | | | | |
|---|---|---|---|---|
| 7,504,596 B2 * | 3/2009 | Chou | H01H 13/705 200/5 A |
| 9,472,361 B1 * | 10/2016 | Mikan | H01H 13/785 |
| 9,785,194 B2 * | 10/2017 | Sprenger | G06F 1/1662 |
| 10,523,233 B1 * | 12/2019 | Stagg | H03M 1/36 |
| 2011/0062008 A1 * | 3/2011 | Cheng | G06F 1/1613 200/5 A |
| 2023/0142935 A1 * | 5/2023 | Zhu | H01H 13/06 200/5 A |

OTHER PUBLICATIONS

"Keyboard technology," Wikipedia, last edited Jun. 23, 2023; accessed Jul. 5, 2023 at https://en.wikipedia.org/wiki/Keyboard_technology; 4 pages.

* cited by examiner

*Primary Examiner* — Anthony M Haughton
(74) *Attorney, Agent, or Firm* — Alliance IP, LLC

(57) ABSTRACT

In one embodiment, a keyboard includes keys disposed in respective holes of a housing, a set of first conductive pads coupled to respective keys, and a set of second conductive pads coupled to surfaces of the housing defining respective holes. The keys are configured such that the first conductive pad of a key is not in contact with a second conductive pad of a hole corresponding to the key when the key is in a first position (e.g., not actuated), and the first conductive pad of the key is in contact with the second conductive pad of the hole corresponding to the key when the key is in a second position (e.g., actuated).

20 Claims, 9 Drawing Sheets

KEYBOARD SWITCH DESIGN FOR ULTRATHIN COMPUTING DEVICES

BACKGROUND

Mobile computing devices, such as laptop computers, may include a keyboard that utilizes a flexible printed circuit (FPC) underneath a set of keys. The keys may be actuated by a user to cause contact between a conductive pad coupled to the key and a conductive pad of the FPC under the key. The FPC includes conductive pads (e.g., those under each key), traces, and/or circuitry to provide signals to a computing device component (e.g., a processor) which key or keys have been actuated by the user.

DETAILED DESCRIPTION

Figure 1:
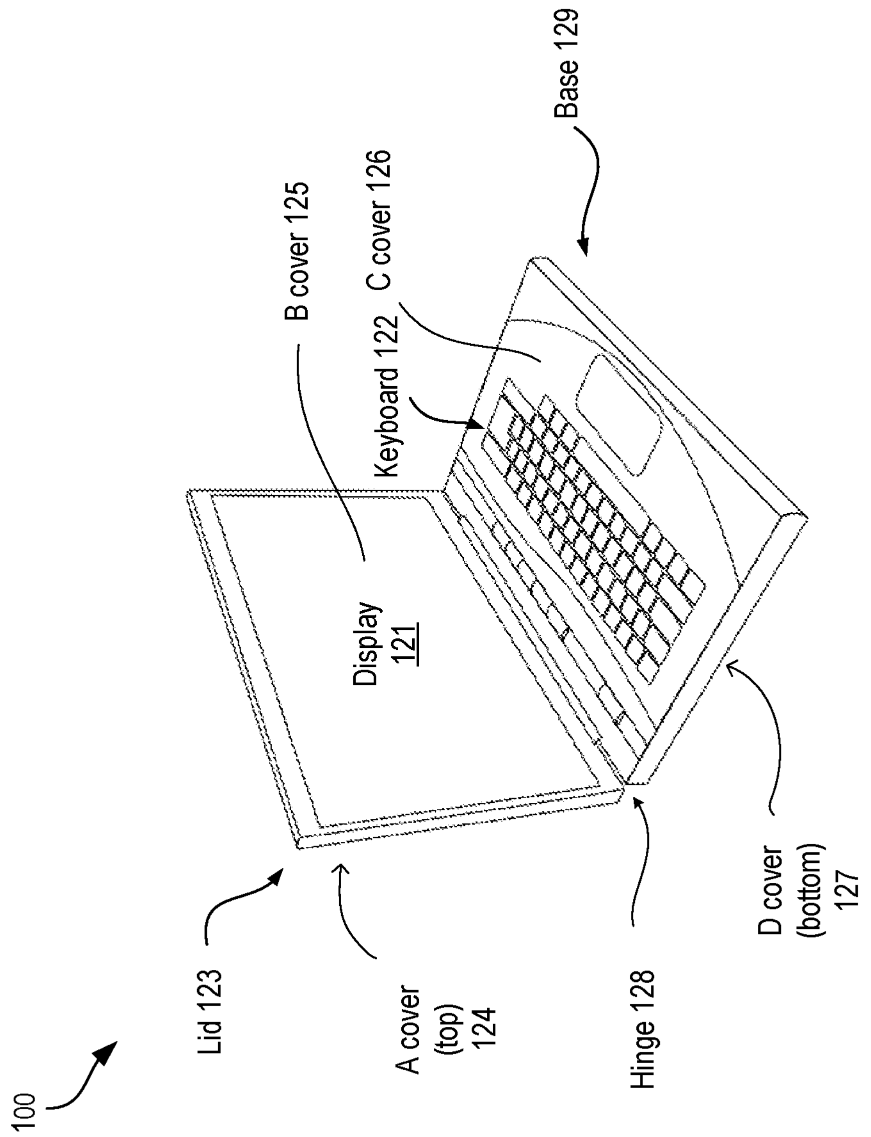
FIG. 1 illustrates an example computing device in which aspects of the present disclosure may be incorporated.

Aspects of the present disclosure provide a keyboard switch mechanism that can allow for thinner keyboards, and thus, thinner computing devices. In current laptop computing devices, for instance, a keyboard thickness may be between 3-4 mm, which can account for approximately 30-40% of the overall computing device thickness in certain instances. Aspects herein may allow for a reduction in the overall keyboard thickness by incorporating the actuation circuitry near, within, or around the keys rather than underneath the keys as in certain current designs (e.g., those using a flexible printed circuit (FPC) under the keys).

In the following description, specific details are set forth, but aspects of the technologies described herein may be practiced without these specific details. Well-known circuits, structures, and techniques have not been shown in detail to avoid obscuring an understanding of this description. "An embodiment," "various embodiments," "some embodiments," and the like may include features, structures, or characteristics, but not every embodiment necessarily includes the particular features, structures, or characteristics.

Some embodiments may have some, all, or none of the features described for other embodiments. "First," "second," "third," and the like describe a common object and indicate different instances of like objects being referred to. Such adjectives do not imply objects so described must be in a given sequence, either temporally or spatially, in ranking, or any other manner. "Connected" may indicate elements are in direct physical or electrical contact with each other and "coupled" may indicate elements co-operate or interact with each other, but they may or may not be in direct physical or electrical contact. Terms modified by the word "substantially" include arrangements, orientations, spacings, or positions that vary slightly from the meaning of the unmodified term. For example, description of a lid of a mobile computing device that can rotate to substantially 360 degrees with respect to a base of the mobile computing includes lids that can rotate to within several degrees of 360 degrees with respect to a device base.

The description may use the phrases "in an embodiment," "in embodiments," "in some embodiments," and/or "in various embodiments," each of which may refer to one or more of the same or different embodiments. Furthermore, the terms "comprising," "including," "having," and the like, as used with respect to aspects of the present disclosure, are synonymous.

Reference is now made to the drawings, which are not necessarily drawn to scale, wherein similar or same numbers may be used to designate same or similar parts in different figures. The use of similar or same numbers in different figures does not mean all figures including similar or same numbers constitute a single or same embodiment. Like numerals having different letter suffixes may represent different instances of similar components. The drawings illustrate generally, by way of example, but not by way of limitation, various embodiments discussed in the present document.

In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims. While aspects of the present disclosure may be used in any suitable type of computing device, the examples below describe example mobile computing devices/environments in which aspects of the present disclosure can be implemented.

FIG. 1 illustrates an example computing device 100 in which aspects of the present disclosure may be incorporated. The computing device 100 can be a laptop (as shown) or another type of mobile computing device with a similar form factor, such as a foldable tablet or smartphone. In some instances, aspects of present disclosure may be incorporated into a free-standing display monitor with a user-facing camera, which may be connected to a computing device that controls the display and camera.

The computing device 100 includes a housing, which includes a lid 123 with an A cover 124 that is a "world-facing" surface of the lid 123 when the computing device 100 is in a closed configuration and a B cover 125 that comprises a user-facing display 121 when the lid 123 is open (e.g., as shown). The computing device 100 also includes a base 129 with a C cover 126 that includes a keyboard 122 that is upward facing when the device 100 is an open configuration (e.g., as shown) and a D cover 127 that forms the bottom of the base 129. In some embodiments, the base 129 includes the primary computing resources (e.g., host processor unit(s), graphics processing unit (GPU)) of the device 100, along with a battery, memory, and storage, and communicates with the lid 123 via wires that pass through a hinge 128 that connects the base 129 with the lid 123. In some embodiments, the computing device 100 can be a dual display device with a second display comprising a portion of the C cover 126. For example, in some embodiments, an "always-on" display (AOD) can occupy a region of the C cover below the keyboard that is visible when the lid 123 is closed. In other embodiments, a second display covers most of the surface of the C cover and a removable keyboard can be placed over the second display or the second display can present a virtual keyboard to allow for keyboard input.

The example keyboard designs described herein can be implemented in a computing device such as the device 100, e.g., using the C cover 126 of the device 100 to route traces as described further below.

Figure 2A:
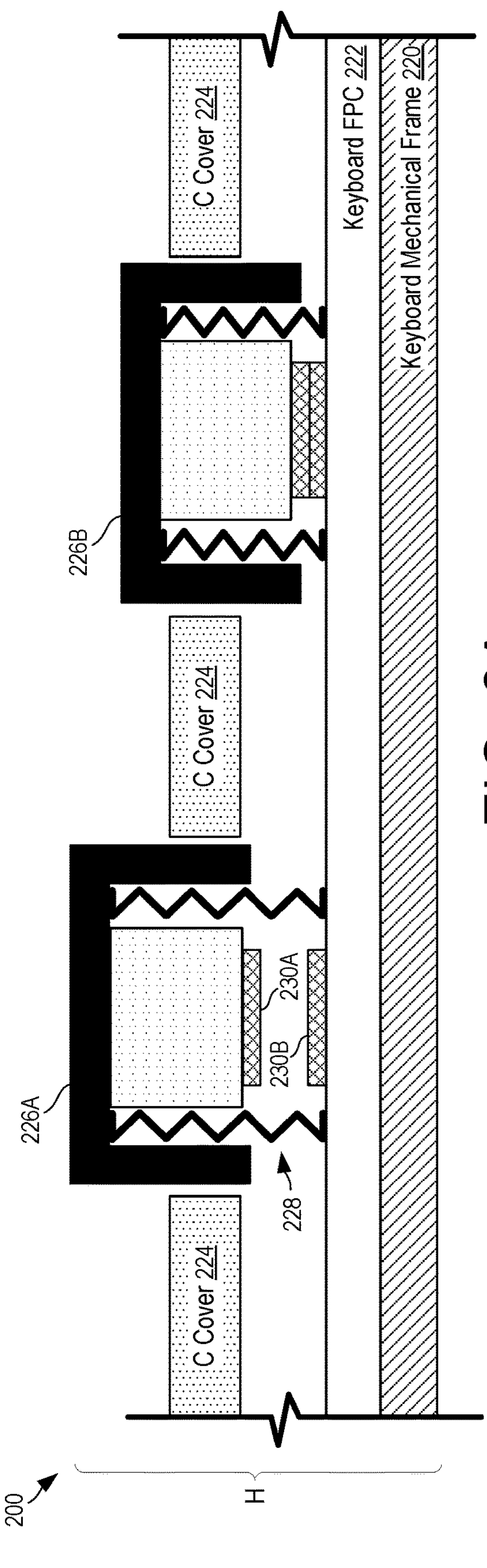
FIG. 2A illustrates a traditional keyboard switch design.
Figure 2B:
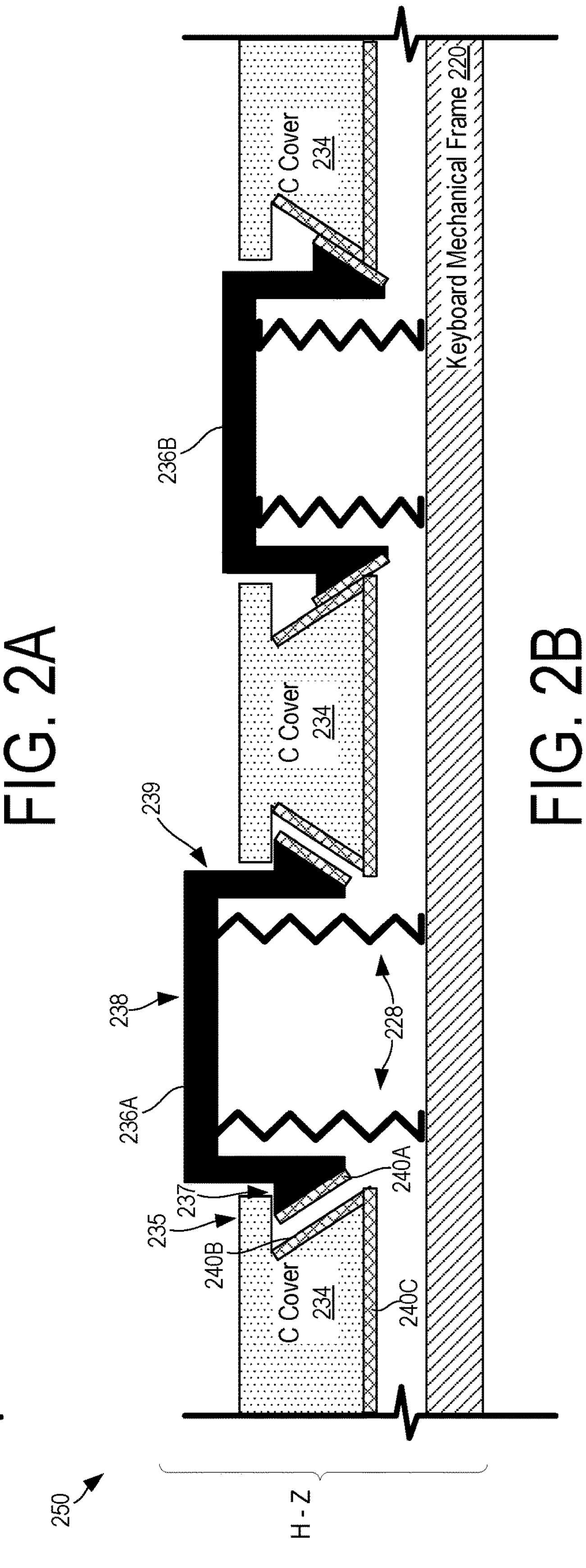
FIG. 2B illustrates an example keyboard switch design in accordance with aspects of the present disclosure.

FIG. 2A illustrates a traditional keyboard switch design 200, while FIG. 2B illustrates an example keyboard switch design embodiment 250 in accordance with aspects of the present disclosure. Referring first to the example of FIG. 2A, the example design 200 includes a keyboard mechanical frame 220 on which a keyboard flexible printed circuit (FPC) 222 rests. The frame 220 may be located within the housing of the device incorporating the keyboard design, e.g., between the C cover and D cover of a laptop computing device such as device 100. The FPC 222 includes circuitry, e.g., traces and conductive pads (e.g., 230B) for providing signals to one or more components (e.g., a processor) of a computing device incorporating the FPC 222. The design 200 includes a C cover 224 (e.g., the C cover 126 of FIG. 1) in which the keys 226 of the keyboard are located. In the example shown, the keys 226 are actuated by springs (e.g., 228), but the keys may be actuated by other mechanisms, such as scissor-switch key mechanisms or "butterfly" mechanisms. As used herein, actuation of a key may refer to a key being pressed or otherwise moved (e.g., by a user) to cause the key to generate a signal indicating the key has been selected. For instance, in the examples shown, the key 226A is not actuated (e.g., not pressed by a user) while the key 226B is actuated (e.g., pressed by a user). Likewise, the key 236A is not actuated while the key 236B is actuated. In each of the examples shown, actuation causes an electrical connection to be made between a conductive pad coupled to the key and another conductive pad, which causes an electrical signal to be generated to indicate the key has been actuated/selected.

As shown, each key 226 is disposed within a hole of the C cover 224 and includes a conductive pad 230A coupled thereto. The conductive pad 230A is arranged so that it is not in contact with the corresponding conductive pad 230B of the keyboard FPC 222 when the key is not actuated, and is in contact with the corresponding conductive pad 230B of the keyboard FPC 222 when the key is actuated. The contact between the pads 230A, 230B can cause electrical current and/or voltage to flow in the FPC 222 and accordingly signal that the key 226B has been actuated.

In contrast, the example keyboard switch design 250 of FIG. 2B includes conductive pads 240B coupled to a bottom side of the C cover 234, with the pads 240B being coupled to a surface of the C cover defining the hole in which the corresponding key is located. In the example shown, the pads 240A are coupled to an angled lower surface of the keys 236 (i.e., angled with respect to the top surface 238 of the key 236 and/or the side surface 239 of the key 236 (which may be orthogonal to the surface 238 in certain embodiments)), and the pads 240B are coupled to an angled surface of the C cover 234, with the pads 240 being substantially parallel with one another (e.g., +/−5-10° of being parallel with one another). Further, the keys 236 in the example design 250 include a portion 237 that extends away from the main body portion of the key and includes the angled surface. In the example shown, the portion 237 is at least partially under an overhanging portion 235 of the C cover 234. The angled surface of the C cover 234 that includes the pad 240B is located under the overhang portion 235 as shown.

The pads 240B may be coupled to traces (e.g., 240C) that are also coupled to the underside of the C cover 234. The keys 236 include conductive pads 240A on an outer bottom surface as shown. The pads 240A, 240B of FIG. 2B may implement the same general functionality as the pads 230A, 230B of FIG. 2A, respectively. That is, when a key is actuated (e.g., as the key 236B is shown to be in FIG. 2B), the pad 240A coupled to the key becomes in contact with the pads 240B on the underside of the C cover 234, causing electrical current and/or voltage to flow and accordingly signal that the key has been actuated. Conversely, the pads 240A, 240B are not in contact with one another when the key is not actuated (e.g., as the key 236A is shown to be in FIG. 2B).

As shown, the keys of the example design 250 can implement the same spring-based or spring-like actuation mechanism as traditional designs, allowing for no changes in tactile feel to users as compared with current designs as well as no changes (i.e., reduction) in reliability of the current designs. In addition, the example design 250 also allows for a reduction in the stack height of the lower portion of the computing device incorporating the keyboard (e.g., the base of a laptop computing device), as the FPC 222 is no longer needed. This can reduce the stack height by approximately 0.3 mm in certain instances, for example, which can account for approximately 10% of the keyboard height. Because the FPC is no longer needed, devices incorporating this design can thus provide a reduced carbon footprint as there is no longer a need for FPC manufacturing, shipping, storage, etc.

In some embodiments, the keyboard design 250 can provide other advantages as well. For example, the keyboard design 250 can provide a watertight or water resistant seal between the top side of the C cover 234 and the bottom side of the C cover 234. For instance, in certain embodiments, an upper surface of the key 236A (i.e., the portion 237 extending away from the key 236) may be in contact with a lower surface of the portion 235 of the C cover 234 when the key is not actuated. Further, the keyboard design 250 can provide for better key backlighting as there is no FPC or other components needed below the keys 236 (e.g., as in the traditional design 200). Additionally, the example keyboard design 250 may be easier to assemble as compared with the traditional design 200. For example, the keycaps may simply need to be pressed into place with snaps holding them in place.

Figure 3:
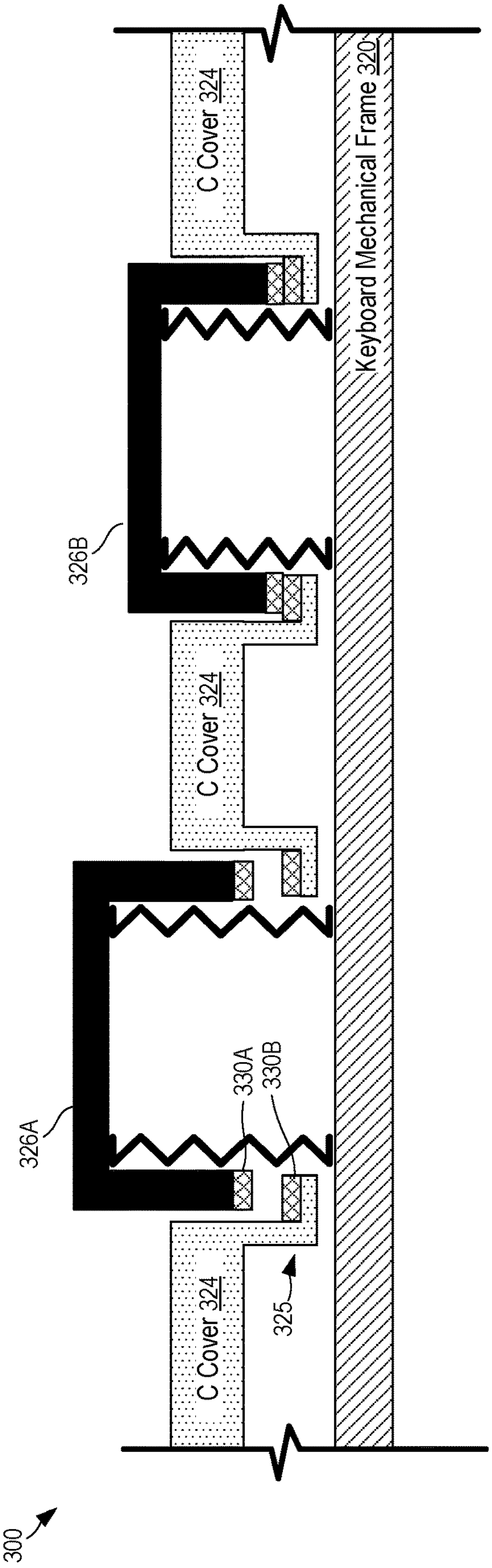
FIG. 3 illustrates another example keyboard switch design in accordance with aspects of the present disclosure.

FIG. 3 illustrates another example keyboard switch design 300 in accordance with aspects of the present disclosure. In the example shown, the design 300 includes a keyboard mechanical frame 320, which is the same or similar to the keyboard mechanical frames described above. The design 300 includes a C cover 324 with "underhang" portions 325 that extend down and out under the keys 326 as shown. The keys 326 include conductive pads 330A on a bottom surface and the underhang portions 325 of the C cover 324 include conductive pads 330B as shown. The pads 330A, 330B of FIG. 3 may implement the same general functionality as the pads 240A, 240B of FIG. 2B, respectively. That is, when a key is actuated (e.g., as the key 336B is shown to be in FIG.

3), the pad 330A coupled to the key becomes in contact with the pads 330B on the underside of the C cover 324, causing electrical current and/or voltage to flow in traces coupled to the C cover 324 (e.g., going into or out of the page) and accordingly signal that the key has been actuated. Conversely, the pads 330A, 330B are not in contact with one another when the key is not actuated (e.g., as the key 326A is shown to be in FIG. 3).

Figure 4:
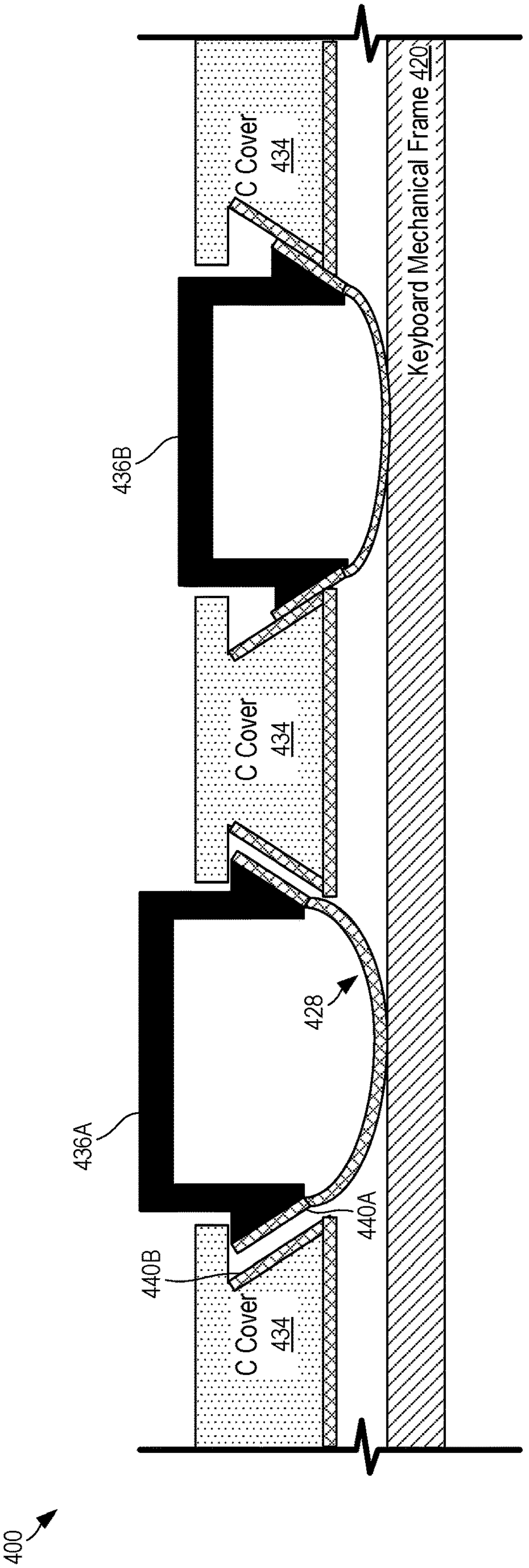
FIG. 4 illustrates yet another example keyboard switch design in accordance with aspects of the present disclosure.

FIG. 4 illustrates yet another example keyboard switch design 400 in accordance with aspects of the present disclosure. In the example shown, the design 400 includes a keyboard mechanical frame 420, which is the same or similar to the keyboard mechanical frames described above. The design 400 is generally similar to the design 250 shown in FIG. 2B and described above but utilizes a different spring mechanism 428 than the spring mechanism 228. For instance, the example design 400 includes conductive pads 440B coupled to a bottom side of the C cover 434 as shown, and the keys 236 include conductive pads 440A on an outer bottom surface as shown. The pads 440A, 440B may implement the same general functionality as the pads 240A, 240B of FIG. 2B, respectively. That is, when a key is actuated (e.g., as the key 436B is shown to be), the pad 440A coupled to the key becomes in contact with the pads 440B on the underside of the C cover 434, causing electrical current and/or voltage to flow and accordingly signal that the key has been actuated. Conversely, the pads 440A, 440B are not in contact with one another when the key is not actuated (e.g., as the key 436A is shown to be).

The spring mechanism 428 in the example shown is arc-shaped, to a leaf spring, and when the key 436 is actuated (e.g., like key 436B) the spring mechanism 428 compresses to push the key back up when not pressed. In some embodiments, the spring mechanism 428 may be a conductive metal that is in contact with the pads 440A, e.g., as shown. In some embodiments, the pads 440A may be a continuous shape that forms the spring mechanism 428 for its respective key 436. In other embodiments, the spring mechanism 428 is formed from a different, e.g., non-conductive, material from the pads 440A.

Although the above examples are described as implementing a signaling scheme in which pressing/actuating a key causes a connection of the pads of the keys (e.g., 240A) and C cover (e.g., 240B), which causes current (or voltage) to flow and signal key actuation, other embodiments may implement a scheme in which a connection between the pads of the keys/C cover indicates no actuation of the key and no connection between the pads of the keys/C cover indicates actuation of the key.

Figure 5:
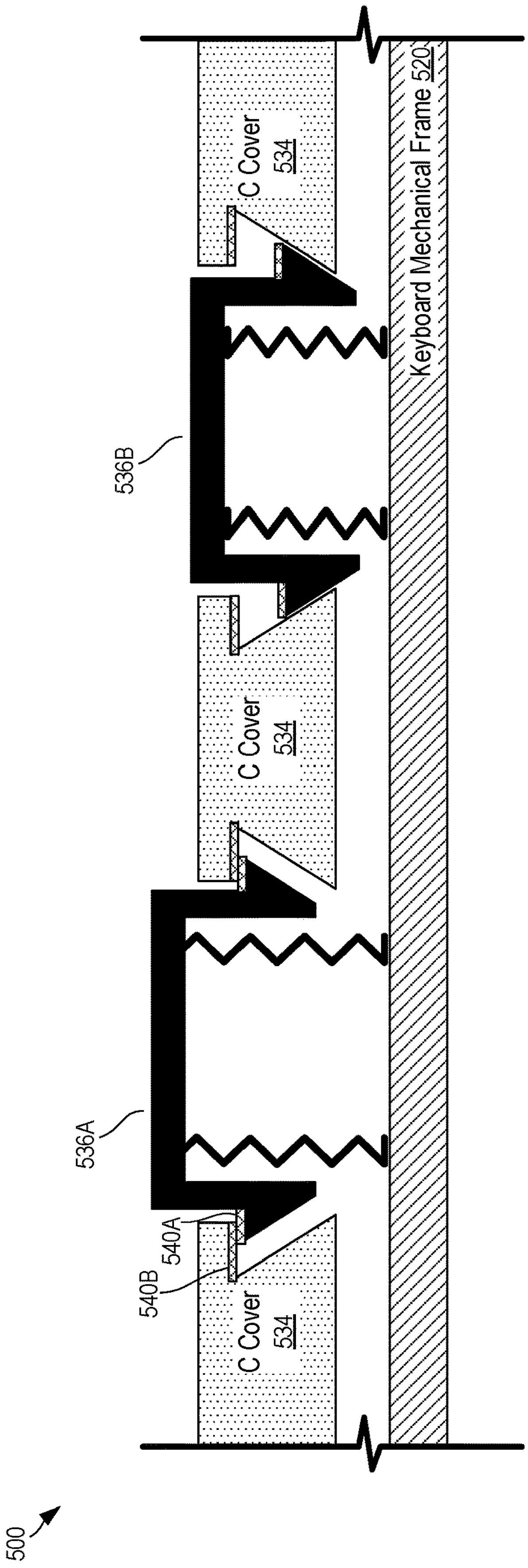
FIG. 5 illustrates still another example keyboard switch design 400 in accordance with aspects of the present disclosure.

FIG. 5 illustrates still another example keyboard switch design 500 in accordance with aspects of the present disclosure. In particular, the example design 500 is similar to the one shown in FIG. 2B and described above, but implements a scheme in which a connection between the pads of the keys/C cover indicates no actuation of the key and no connection between the pads of the keys/C cover indicates actuation of the key. For instance, the keys 536 include pads 540A on an upper surface which extends out from the keys 536 and sits under a portion of the C cover 534 as shown. The C cover 534 includes pads 540B on a bottom surface that extends toward the keys 536 and sits above a portion of the key 536 as shown. As shown, when a key is not actuated (e.g., as shown with key 536B), the pads 540A, 540B are in contact with one another, causing a current or voltage to pass through. However, different from the previously described examples, in this example, the current/voltage indicates no actuation. When the key is actuated (e.g., as shown with key 536B), the pads 540A, 540B are disconnected/not in contact with one another, which is this example, indicates key actuation.

Figure 6:
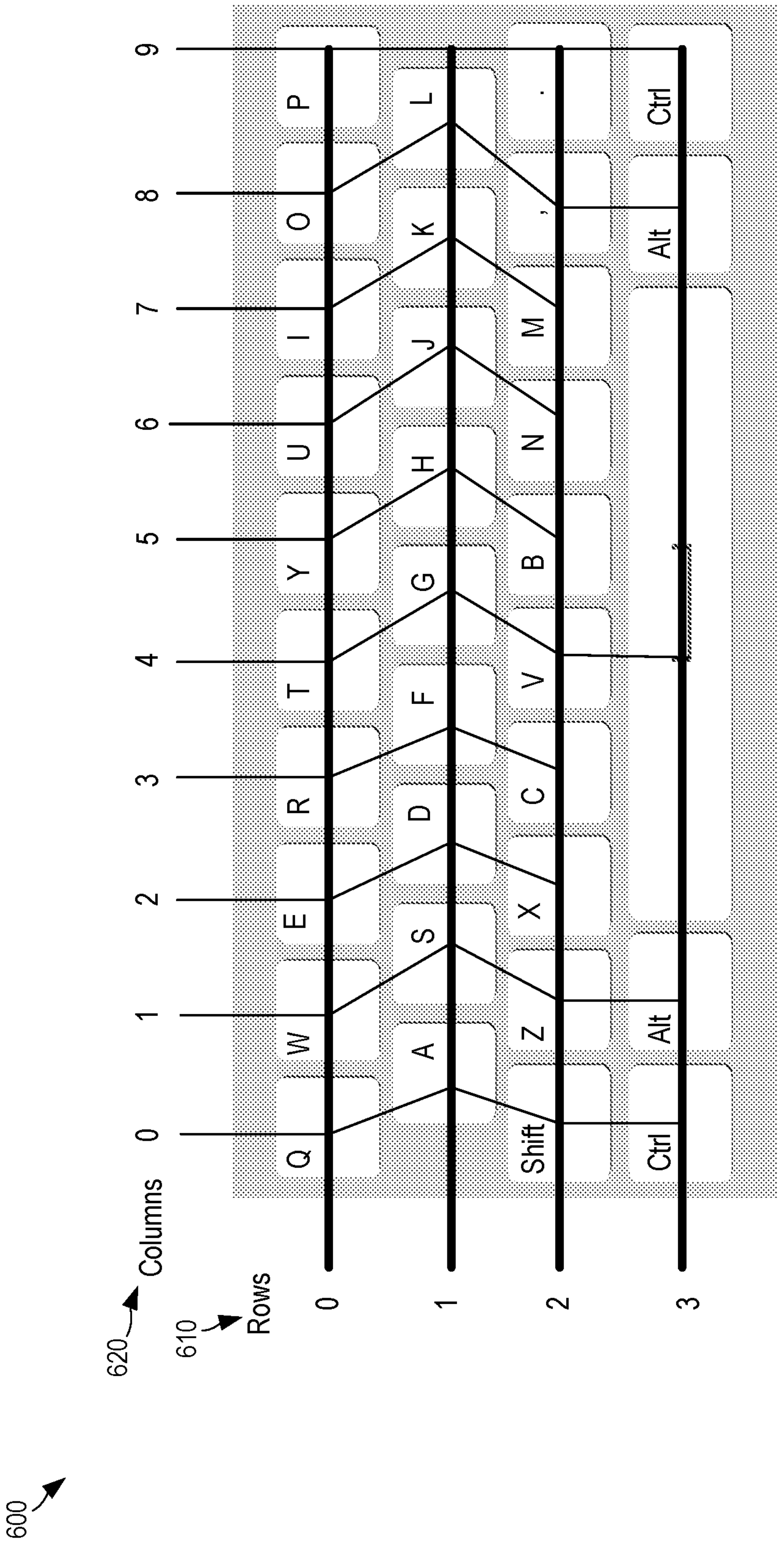
FIG. 6 illustrates an example keyboard addressing scheme which may be used in accordance with aspects of the present disclosure.

FIG. 6 illustrates an example keyboard addressing scheme 600 which may be used in accordance with embodiments herein. The example scheme 600 is shown with respect to a particular keyboard layout; however, the concepts of the example scheme 600 described below may be applied to any other type of keyboard layout, e.g., one with a larger number of keys and/or other keys than those shown in FIG. 6.

The example addressing scheme 600 includes rows 610 and columns 620, which can allow a device (e.g., a processor of a computing device) to detect which key has been actuated. In certain embodiments, a voltage or current may be driven along the rows and actuation of a key may connect the row trace with a column trace. The voltage/current may be driven by keyboard controller circuitry or other suitable circuitry coupled to the keyboard. The voltage/current may be driven in each row in a scanned manner, i.e., first in row 0, then row 1, then row 2, then row 3, and so forth. Based on the scanning and detection of a voltage/current in a particular column trace, the device may determine which key has been actuated. For example, if the A key is actuated, the device may detect a voltage/current in column 0 at a time when row 1 is being driven, and thus, determines the A key has been actuated (e.g., instead of the Q, Shift, or Ctrl keys in the same column). In other embodiments, the voltage/current may be driven from the column side instead and key actuation is detected through voltage/current at a particular row (based on scanning time).

The rows and columns shown may represent electrical traces in the C cover as described above (e.g., 240B). However, such traces may not be located in the location of the rows and columns shown in FIG. 6. Rather, the electrical pads/traces of the C cover may traverse the keyboard in any suitable manner (e.g., may route around each respective key), and the pads connected to the keys may be configured in any suitable way to connect the row and column traces in the C cover. As an example, the pad/trace connected to the keys may be run on the left and upper portions of the keys to connect the row and column traces.

Figure 7:
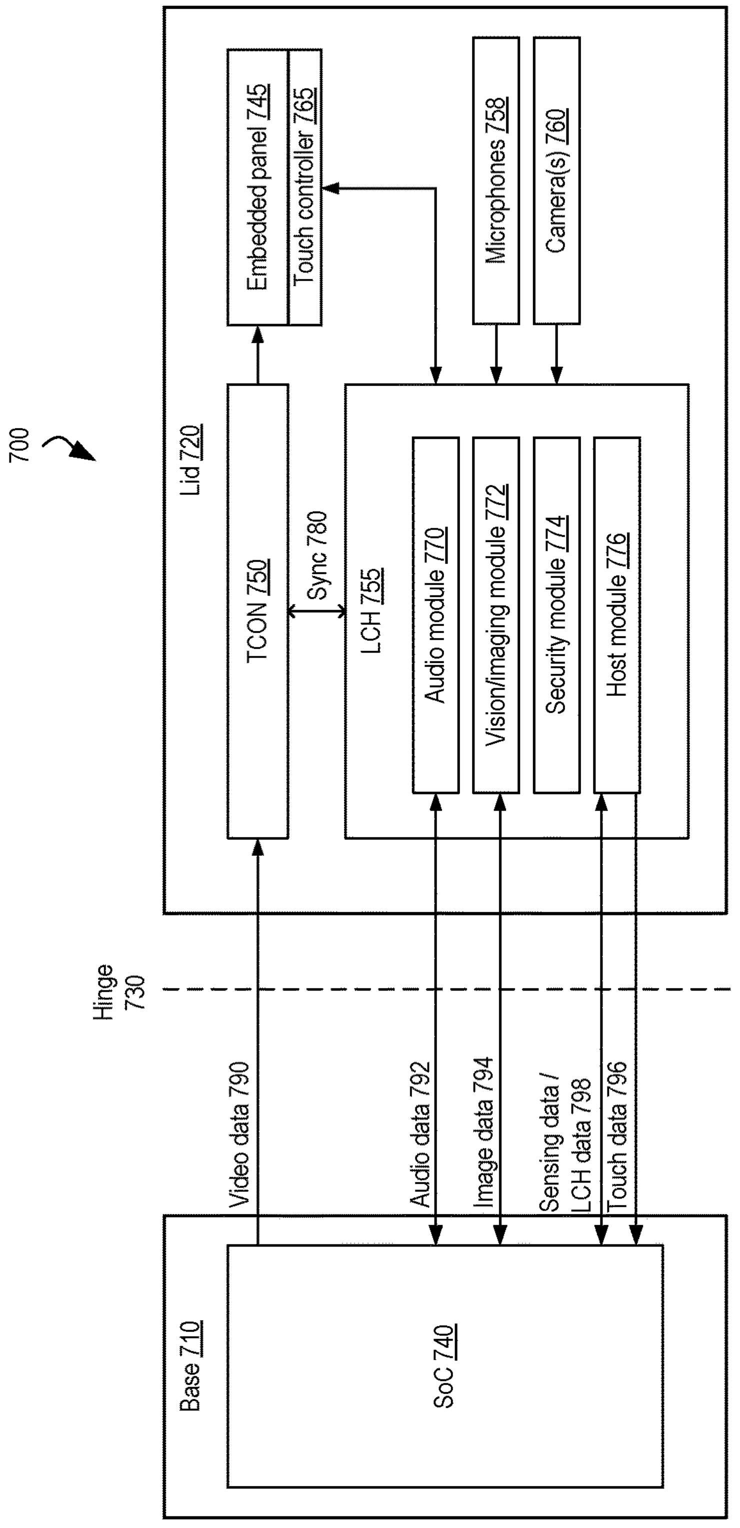
FIG. 7 illustrates an example block diagram of a computing device in which aspects of the present disclosure may be incorporated.

FIG. 7 illustrates an example block diagram of a computing device in which aspects of the present disclosure may be incorporated. The example mobile computing devices shown implement a lid controller hub (e.g., 755) with various circuitries that can enable a reduced number of wires across a hinge of the device, i.e., from the base 710 to the lid 720. However, other embodiments may not implement a lid controller hub as shown and described below (e.g., such functionality may be implemented within the SoC 740).

The computing device 700 comprises a base 710 connected to a lid 720 by a hinge 730. The mobile computing device (also referred to herein as "user device") 700 can be a laptop or a mobile computing device with a similar form factor. The base 710 comprises a host system-on-a-chip (SoC) 740 that comprises one or more processor units integrated with one or more additional components, such as a memory controller, graphics processing unit (GPU), caches, an image processing module, and other components described herein. The base 710 can further comprise a physical keyboard, touchpad, battery, memory, storage, and external ports. The lid 720 comprises an embedded display panel 745, a timing controller (TCON) 750, a lid controller hub (LCH) 755, microphones 758, one or more cameras 760, and a touch controller 765. TCON 750 converts video data 790 received from the SoC 740 into signals that drive the display panel 745.

The display panel 745 can be any type of embedded display in which the display elements responsible for generating light or allowing the transmission of light are located in each pixel. Such displays may include TFT LCD (thin-film-transistor liquid crystal display), micro-LED (micro-light-emitting diode (LED)), OLED (organic LED), and QLED (quantum dot LED) displays. A touch controller 765 drives the touchscreen technology utilized in the display panel 745 and collects touch sensor data provided by the employed touchscreen technology. The display panel 745 can comprise a touchscreen comprising one or more dedicated layers for implementing touch capabilities or 'in-cell' or 'on-cell' touchscreen technologies that do not require dedicated touchscreen layers.

The microphones 758 can comprise microphones located in the bezel of the lid or in-display microphones located in the display area, the region of the panel that displays content. The one or more cameras 760 can similarly comprise cameras located in the bezel or in-display cameras located in the display area.

LCH 755 comprises an audio module 770, a vision/imaging module 772, a security module 774, and a host module 776. The audio module 770, the vision/imaging module 772 and the host module 776 interact with lid sensors process the sensor data generated by the sensors. The audio module 770 interacts with the microphones 758 and processes audio sensor data generated by the microphones 758, the vision/imaging module 772 interacts with the one or more cameras 760 and processes image sensor data generated by the one or more cameras 760, and the host module 776 interacts with the touch controller 765 and processes touch sensor data generated by the touch controller 765. A synchronization signal 780 is shared between the TCON 750 and the LCH 755. The synchronization signal 780 can be used to synchronize the sampling of touch sensor data and the delivery of touch sensor data to the SoC 740 with the refresh rate of the display panel 745 to allow for a smooth and responsive touch experience at the system level.

As used herein, the phrase "sensor data" can refer to sensor data generated or provided by sensor as well as sensor data that has undergone subsequent processing. For example, image sensor data can refer to sensor data received at a frame router in a vision/imaging module as well as processed sensor data output by a frame router processing stack in a vision/imaging module. The phrase "sensor data" can also refer to discrete sensor data (e.g., one or more images captured by a camera) or a stream of sensor data (e.g., a video stream generated by a camera, an audio stream generated by a microphone). The phrase "sensor data" can further refer to metadata generated from the sensor data, such as a gesture determined from touch sensor data or a head orientation or facial landmark information generated from image sensor data.

The audio module 770 processes audio sensor data generated by the microphones 758 and in some embodiments enables features such as Wake on Voice (causing the device 700 to exit from a low-power state when a voice is detected in audio sensor data), Speaker ID (causing the device 700 to exit from a low-power state when an authenticated user's voice is detected in audio sensor data), acoustic context awareness (e.g., filtering undesirable background noises), speech and voice pre-processing to condition audio sensor data for further processing by neural network accelerators, dynamic noise reduction, and audio-based adaptive thermal solutions.

The vision/imaging module 772 processes image sensor data generated by the one or more cameras 760 and in various embodiments can enable features such as Wake on Face (causing the device 700 to exit from a low-power state when a face is detected in image sensor data) and Face ID (causing the device 700 to exit from a low-power state when an authenticated user's face is detected in image sensor data). In some embodiments, the vision/imaging module 772 can enable one or more of the following features: head orientation detection, determining the location of facial landmarks (e.g., eyes, mouth, nose, eyebrows, cheek) in an image, and multi-face detection.

The host module 776 processes touch sensor data provided by the touch controller 765. The host module 776 is able to synchronize touch-related actions with the refresh rate of the embedded panel 745. This allows for the synchronization of touch and display activities at the system level, which provides for an improved touch experience for any application operating on the mobile computing device.

The hinge 730 can be any physical hinge that allows the base 710 and the lid 720 to be rotatably connected. The wires that pass across the hinge 730 comprise wires for passing video data 790 from the SoC 740 to the TCON 750, wires for passing audio data 792 between the SoC 740 and the audio module 770, wires for providing image data 794 from the vision/imaging module 772 to the SoC 740, wires for providing touch data 796 from the LCH 755 to the SoC 740, and wires for providing data 798 determined from image sensor data and other information generated by the LCH 755 from the host module 776 to the SoC 740. In some embodiments, data shown as being passed over different sets of wires between the SoC and LCH are communicated over the same set of wires. For example, in some embodiments, all of the different types of data shown can be sent over a single PCIe-based or USB-based data bus.

In some embodiments, the lid 720 is removably attachable to the base 710. In some embodiments, the hinge can allow the base 710 and the lid 720 to rotate to substantially 360 degrees with respect to each other. In some embodiments, the hinge 730 carries fewer wires to communicatively couple the lid 720 to the base 710 relative to existing computing devices that do not have an LCH. This reduction in wires across the hinge 730 can result in lower device cost, not just due to the reduction in wires, but also due to being a simpler electromagnetic and radio frequency interface (EMI/RFI) solution.

The components illustrated in FIG. 7 as being located in the base of a mobile computing device can be located in a base housing and components illustrated in FIG. 7 as being located in the lid of a mobile computing device can be located in a lid housing.

Figure 8:
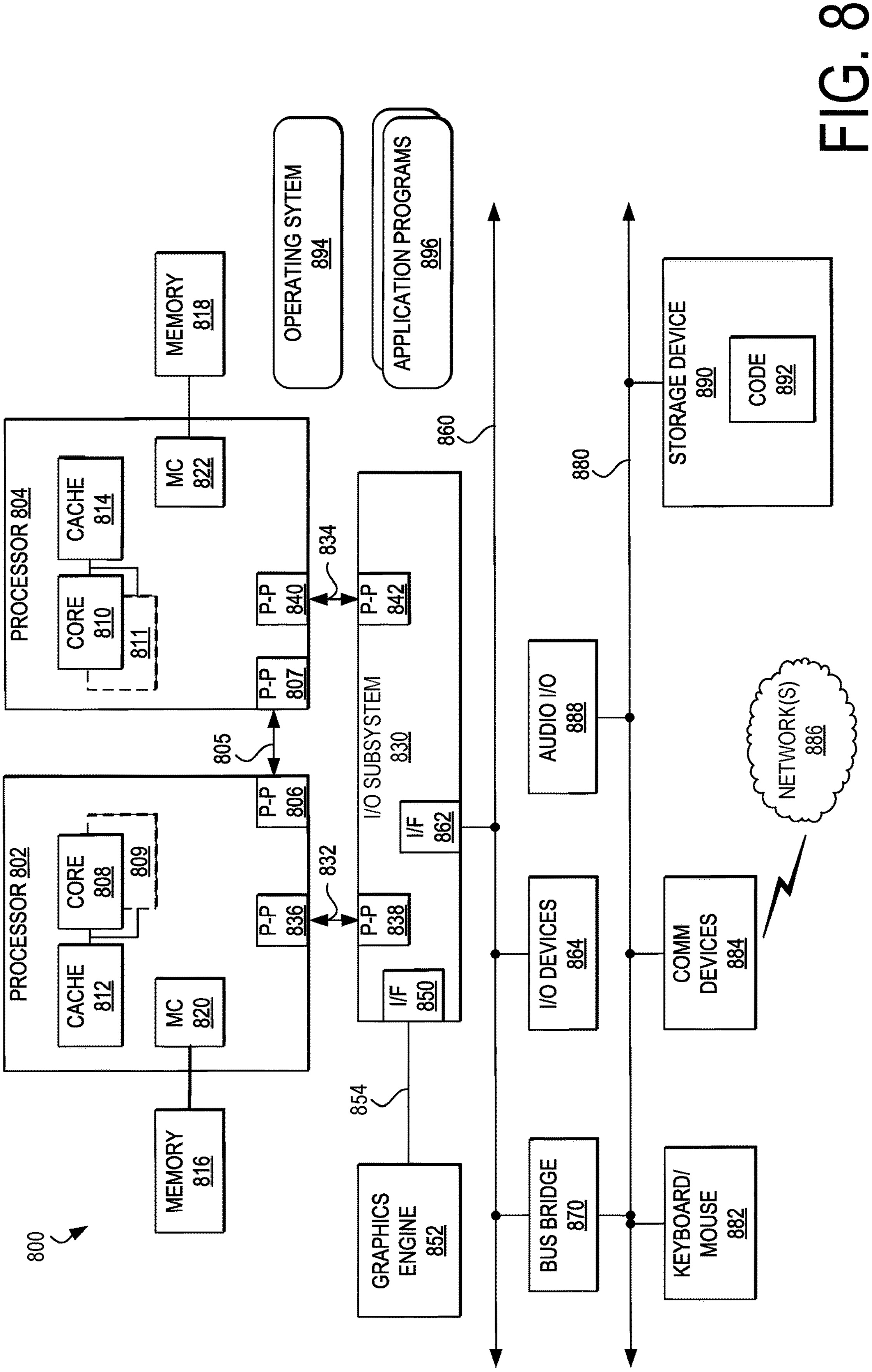
FIG. 8 is a block diagram of computing device components which may be included in a mobile computing device incorporating aspects of the present disclosure.

FIG. 8 is a block diagram of computing device components which may be included in a mobile computing device incorporating aspects of the present disclosure. In some embodiments, the components shown may be implemented within the SoC 740 of FIG. 7, for instance. Generally, components shown in FIG. 8 can communicate with other shown components, including those in a lid controller hub, although not all connections are shown, for ease of illustration. The components 800 comprise a multiprocessor system comprising a first processor 802 and a second processor 804 and is illustrated as comprising point-to-point (P-P) interconnects. For example, a point-to-point (P-P) interface 806 of the processor 802 is coupled to a point-to-point interface 807 of the processor 804 via a point-to-point interconnection 805. It is to be understood that any or all of the point-to-point interconnects illustrated in FIG. 8 can be alternatively implemented as a multi-drop bus, and that any or all buses illustrated in FIG. 8 could be replaced by point-to-point interconnects.

As shown in FIG. 8, the processors 802 and 804 are multicore processors. Processor 802 comprises processor cores 808 and 809, and processor 804 comprises processor cores 810 and 811. Processor cores 808-811 can execute computer-executable instructions in a manner similar to that discussed below in connection with FIG. 9, or in other manners.

Processors 802 and 804 further comprise at least one shared cache memory 812 and 814, respectively. The shared caches 812 and 814 can store data (e.g., instructions) utilized by one or more components of the processor, such as the processor cores 808-809 and 810-811. The shared caches 812 and 814 can be part of a memory hierarchy for the device. For example, the shared cache 812 can locally store data that is also stored in a memory 816 to allow for faster access to the data by components of the processor 802. In some embodiments, the shared caches 812 and 814 can comprise multiple cache layers, such as level 1 (L1), level 2 (L2), level 3 (L3), level 4 (L4), and/or other caches or cache layers, such as a last level cache (LLC).

Although two processors are shown, the device can comprise any number of processors or other compute resources, including those in a lid controller hub. Further, a processor can comprise any number of processor cores. A processor can take various forms such as a central processing unit, a controller, a graphics processor, an accelerator (such as a graphics accelerator, digital signal processor (DSP), or artificial intelligence (AI) accelerator)). A processor in a device can be the same as or different from other processors in the device. In some embodiments, the device can comprise one or more processors that are heterogeneous or asymmetric to a first processor, accelerator, field programmable gate array (FPGA), or any other processor. There can be a variety of differences between the processing elements in a system in terms of a spectrum of metrics of merit including architectural, microarchitectural, thermal, power consumption characteristics and the like. These differences can effectively manifest themselves as asymmetry and heterogeneity amongst the processors in a system. In some embodiments, the processors 802 and 804 reside in a multi-chip package. As used herein, the terms "processor unit" and "processing unit" can refer to any processor, processor core, component, module, engine, circuitry or any other processing element described herein. A processor unit or processing unit can be implemented in hardware, software, firmware, or any combination thereof capable of. A lid controller hub can comprise one or more processor units.

Processors 802 and 804 further comprise memory controller logic (MC) 820 and 822. As shown in FIG. 8, MCs 820 and 822 control memories 816 and 818 coupled to the processors 802 and 804, respectively. The memories 816 and 818 can comprise various types of memories, such as volatile memory (e.g., dynamic random-access memories (DRAM), static random-access memory (SRAM)) or non-volatile memory (e.g., flash memory, solid-state drives, chalcogenide-based phase-change non-volatile memories). While MCs 820 and 822 are illustrated as being integrated into the processors 802 and 804, in alternative embodiments, the MCs can be logic external to a processor, and can comprise one or more layers of a memory hierarchy.

Processors 802 and 804 are coupled to an Input/Output (I/O) subsystem 830 via P-P interconnections 832 and 834. The point-to-point interconnection 832 connects a point-to-point interface 836 of the processor 802 with a point-to-point interface 838 of the I/O subsystem 830, and the point-to-point interconnection 834 connects a point-to-point interface 840 of the processor 804 with a point-to-point interface 842 of the I/O subsystem 830. Input/Output subsystem 830 further includes an interface 850 to couple I/O subsystem 830 to a graphics module 852, which can be a high-performance graphics module. The I/O subsystem 830 and the graphics module 852 are coupled via a bus 854. Alternately, the bus 854 could be a point-to-point interconnection.

Input/Output subsystem 830 is further coupled to a first bus 860 via an interface 862. The first bus 860 can be a Peripheral Component Interconnect (PCI) bus, a PCI Express (PCIe) bus, another third generation I/O (input/output) interconnection bus or any other type of bus.

Various I/O devices 864 can be coupled to the first bus 860. A bus bridge 870 can couple the first bus 860 to a second bus 880. In some embodiments, the second bus 880 can be a low pin count (LPC) bus. Various devices can be coupled to the second bus 880 including, for example, a keyboard/mouse 882, audio I/O devices 888 and a storage device 890, such as a hard disk drive, solid-state drive or other storage device for storing computer-executable instructions (code) 892. The code 892 can comprise computer-executable instructions for performing technologies described herein. Additional components that can be coupled to the second bus 880 include communication device(s) or components 884, which can provide for communication between the device and one or more wired or wireless networks 886 (e.g. Wi-Fi, cellular or satellite networks) via one or more wired or wireless communication links (e.g., wire, cable, Ethernet connection, radio-frequency (RF) channel, infrared channel, Wi-Fi channel) using one or more communication standards (e.g., IEEE 802.11 standard and its supplements).

The device can comprise removable memory such as flash memory cards (e.g., SD (Secure Digital) cards), memory sticks, Subscriber Identity Module (SIM) cards). The memory in the computing device (including caches 812 and 814, memories 816 and 818 and storage device 890, and memories in the lid controller hub) can store data and/or computer-executable instructions for executing an operating system 894, or application programs 896. Example data includes web pages, text messages, images, sound files, video data, sensor data or any other data received from a lid controller hub, or other data sets to be sent to and/or received from one or more network servers or other devices by the device via one or more wired or wireless networks, or for use by the device. The device can also have access to external memory (not shown) such as external hard drives or cloud-based storage.

The operating system 894 can control the allocation and usage of the components illustrated in FIG. 8 and support one or more application programs 896. The application programs 896 can include common mobile computing device applications (e.g., email applications, calendars, contact managers, web browsers, messaging applications) as well as other computing applications.

The device can support various input devices, such as a touchscreen, microphones, cameras (monoscopic or stereoscopic), trackball, touchpad, trackpad, mouse, keyboard, proximity sensor, light sensor, pressure sensor, infrared sensor, electrocardiogram (ECG) sensor, PPG (photoplethysmogram) sensor, galvanic skin response sensor, and one or more output devices, such as one or more speakers or displays. Any of the input or output devices can be internal to, external to or removably attachable with the device.

External input and output devices can communicate with the device via wired or wireless connections.

In addition, the computing device can provide one or more natural user interfaces (NUIs). For example, the operating system 894, applications 896, or a lid controller hub can comprise speech recognition as part of a voice user interface that allows a user to operate the device via voice commands. Further, the device can comprise input devices and components that allows a user to interact with the device via body, hand, or face gestures.

The device can further comprise one or more communication components 884. The components 884 can comprise wireless communication components coupled to one or more antennas to support communication between the device and external devices. Antennas can be located in a base, lid, or other portion of the device. The wireless communication components can support various wireless communication protocols and technologies such as Near Field Communication (NFC), IEEE 1002.11 (Wi-Fi) variants, WiMax, Bluetooth, Zigbee, 4G Long Term Evolution (LTE), Code Division Multiplexing Access (CDMA), Universal Mobile Telecommunication System (UMTS) and Global System for Mobile Telecommunication (GSM). In addition, the wireless modems can support communication with one or more cellular networks for data and voice communications within a single cellular network, between cellular networks, or between the mobile computing device and a public switched telephone network (PSTN).

The device can further include at least one input/output port (which can be, for example, a USB, IEEE 1394 (FireWire), Ethernet and/or RS-232 port) comprising physical connectors; a power supply (such as a rechargeable battery); a satellite navigation system receiver, such as a GPS receiver; a gyroscope; an accelerometer; and a compass. A GPS receiver can be coupled to a GPS antenna. The device can further include one or more additional antennas coupled to one or more additional receivers, transmitters and/or transceivers to enable additional functions.

FIG. 8 illustrates one example computing device architecture. Computing devices based on alternative architectures can be used to implement technologies described herein. For example, instead of the processors 802 and 804, and the graphics module 852 being located on discrete integrated circuits, a computing device can comprise a SoC (system-on-a-chip) integrated circuit incorporating one or more of the components illustrated in FIG. 8. In one example, an SoC can comprise multiple processor cores, cache memory, a display driver, a GPU, multiple I/O controllers, an AI accelerator, an image processing unit driver, I/O controllers, an AI accelerator, an image processor unit. Further, a computing device can connect elements via bus or point-to-point configurations different from that shown in FIG. 8. Moreover, the illustrated components in FIG. 8 are not required or all-inclusive, as shown components can be removed and other components added in alternative embodiments.

Figure 9:
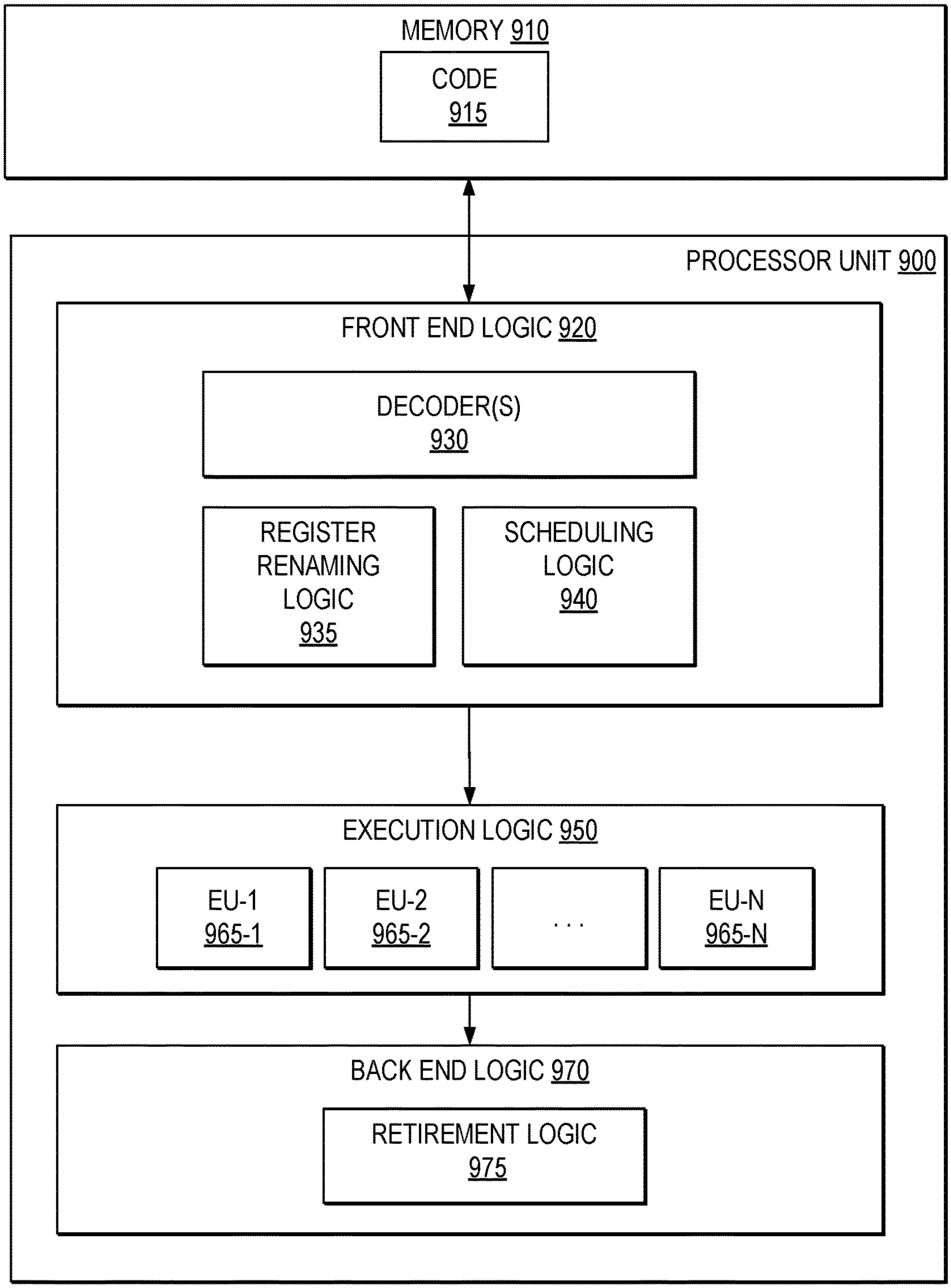
FIG. 9 is a block diagram of an exemplary processor unit that can execute instructions.

FIG. 9 is a block diagram of an example processor unit 900 to execute computer-executable instructions. The processor unit 900 can be any type of processor or processor core, such as a microprocessor, an embedded processor, a digital signal processor (DSP), network processor, or accelerator. The processor unit 900 can be a single-threaded core or a multithreaded core in that it may include more than one hardware thread context (or "logical processor") per core.

FIG. 9 also illustrates a memory 910 coupled to the processor 900. The memory 910 can be any memory described herein or any other memory known to those of skill in the art. The memory 910 can store computer-executable instructions 915 (code) executable by the processor unit 900.

The processor core comprises front-end logic 920 that receives instructions from the memory 910. An instruction can be processed by one or more decoders 930. The decoder 930 can generate as its output a micro operation such as a fixed width micro operation in a predefined format, or generate other instructions, microinstructions, or control signals, which reflect the original code instruction. The front-end logic 920 further comprises register renaming logic 935 and scheduling logic 940, which generally allocate resources and queues operations corresponding to converting an instruction for execution.

The processor unit 900 further comprises execution logic 950, which comprises one or more execution units (EUs) 965-1 through 965-N. Some processor core embodiments can include a number of execution units dedicated to specific functions or sets of functions. Other embodiments can include only one execution unit or one execution unit that can perform a particular function. The execution logic 950 performs the operations specified by code instructions. After completion of execution of the operations specified by the code instructions, back end logic 970 retires instructions using retirement logic 975. In some embodiments, the processor unit 900 allows out of order execution but requires in-order retirement of instructions. Retirement logic 975 can take a variety of forms as known to those of skill in the art (e.g., re-order buffers or the like).

The processor unit 900 is transformed during execution of instructions, at least in terms of the output generated by the decoder 930, hardware registers and tables utilized by the register renaming logic 935, and any registers (not shown) modified by the execution logic 950. Although not illustrated in FIG. 9, a processor can include other elements on an integrated chip with the processor unit 900. For example, a processor may include additional elements such as memory control logic, one or more graphics modules, I/O control logic and/or one or more caches.

As used in any embodiment herein, the term "module" refers to logic that may be implemented in a hardware component or device, software or firmware running on a processor, or a combination thereof, to perform one or more operations consistent with the present disclosure. Software may be embodied as a software package, code, instructions, instruction sets and/or data recorded on non-transitory computer-readable storage mediums. Firmware may be embodied as code, instructions or instruction sets and/or data that are hard-coded (e.g., nonvolatile) in memory devices. As used in any embodiment herein, the term "circuitry" can comprise, for example, singly or in any combination, hardwired circuitry, programmable circuitry such as computer processors comprising one or more individual instruction processing cores, state machine circuitry, and/or firmware that stores instructions executed by programmable circuitry. Modules described herein may, collectively or individually, be embodied as circuitry that forms a part of one or more devices. Thus, any of the modules can be implemented as circuitry, such as continuous itemset generation circuitry, entropy-based discretization circuitry, etc. A computer device referred to as being programmed to perform a method can be programmed to perform the method via software, hardware, firmware or combinations thereof.

In some embodiments, a lid controller hub is a packaged integrated circuit comprising components (modules, ports, controllers, driver, timings, blocks, accelerators, processors, etc.) described herein as being a part of the lid controller hub. Lid controller hub components can be implemented as dedicated circuitry, programmable circuitry that operates firmware or software, or a combination thereof. Thus, modules can be alternately referred to as "circuitry" (e.g., "image preprocessing circuitry"). Modules can also be alternately referred to as "engines" (e.g., "security engine", "host engine", "vision/imaging engine," "audio engine") and an "engine" can be implemented as a combination of hardware, software, firmware or a combination thereof. Further, lid controller hub modules (e.g., audio module, vision/imaging module) can be combined with other modules and individual modules can be split into separate modules.

The use of reference numbers in the claims and the specification is meant as in aid in understanding the claims and the specification and is not meant to be limiting.

Any of the disclosed methods can be implemented as computer-executable instructions or a computer program product. Such instructions can cause a computer or one or more processors capable of executing computer-executable instructions to perform any of the disclosed methods. Generally, as used herein, the term "computer" refers to any computing device or system described or mentioned herein, or any other computing device. Thus, the term "computer-executable instruction" refers to instructions that can be executed by any computing device described or mentioned herein, or any other computing device.

The computer-executable instructions or computer program products as well as any data created and used during implementation of the disclosed technologies can be stored on one or more tangible or non-transitory computer-readable storage media, such as optical media discs (e.g., DVDs, CDs), volatile memory components (e.g., DRAM, SRAM), or non-volatile memory components (e.g., flash memory, solid state drives, chalcogenide-based phase-change non-volatile memories). Computer-readable storage media can be contained in computer-readable storage devices such as solid-state drives, USB flash drives, and memory modules. Alternatively, the computer-executable instructions may be performed by specific hardware components that contain hardwired logic for performing all or a portion of disclosed methods, or by any combination of computer-readable storage media and hardware components.

The computer-executable instructions can be part of, for example, a dedicated software application or a software application that is accessed via a web browser or other software application (such as a remote computing application). Such software can be read and executed by, for example, a single computing device or in a network environment using one or more networked computers. Further, it is to be understood that the disclosed technology is not limited to any specific computer language or program. For instance, the disclosed technologies can be implemented by software written in C++, Java, Perl, Python, JavaScript, Adobe Flash, or any other suitable programming language. Likewise, the disclosed technologies are not limited to any particular computer or type of hardware.

Furthermore, any of the software-based embodiments (comprising, for example, computer-executable instructions for causing a computer to perform any of the disclosed methods) can be uploaded, downloaded or remotely accessed through a suitable communication means. Such suitable communication means include, for example, the Internet, the World Wide Web, an intranet, cable (including fiber optic cable), magnetic communications, electromagnetic communications (including RF, microwave, and infrared communications), electronic communications, or other such communication means.

As used in this application and in the claims, a list of items joined by the term "and/or" can mean any combination of the listed items. For example, the phrase "A, B and/or C" can mean A; B; C; A and B; A and C; B and C; or A, B, and C. Further, as used in this application and in the claims, a list of items joined by the term "at least one of" can mean any combination of the listed terms. For example, the phrase "at least one of A, B, or C" can mean A; B; C; A and B; A and C; B and C; or A, B, and C. Moreover, as used in this application and in the claims, a list of items joined by the term "one or more of" can mean any combination of the listed terms. For example, the phrase "one or more of A, B and C" can mean A; B; C; A and B; A and C; B and C; or A, B, and C.

The disclosed methods, apparatuses and systems are not to be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it is to be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Additional examples of the present disclosure include the following, non-limiting implementations. Each of the following non-limiting examples may stand on its own or may be combined in any permutation or combination with any one or more of the other examples provided below or throughout the present disclosure.

Example 1 is an apparatus comprising: a housing defining a plurality of holes; a plurality of keys, each key disposed in a respective hole of the housing; a set of first conductive pads, each first conductive pad coupled to a respective key; a set of second conductive pads, each second conductive pad coupled to a surface of the housing defining a respective hole; wherein a first conductive pad of a key is not in contact with a second conductive pad of a hole corresponding to the key when the key is in a first position, and the first conductive pad of the key is in contact with the second conductive pad of the hole corresponding to the key when the key is in a second position.

Example 2 includes the subject matter of Example 1, wherein the second position corresponds to actuation of the key.

Example 3 includes the subject matter of Example 1 or 2, wherein the surfaces of the housing on which the second conductive pads are coupled are substantially parallel to the surfaces of the key on which the first conductive pads are coupled.

Example 4 includes the subject matter of any one of Examples 1-3, wherein each key comprises a portion extending away from a main body of the key and disposed under an overhanging portion of the housing that at least partially defines the hole, and wherein the first conductive pad is coupled to the portion of the key extending away from the main body of the key.

Example 5 includes the subject matter of any one of Examples 1-3, wherein each first conductive pad is on a lower surface of the key and each second conductive pad is on a surface of the housing disposed under the key.

Example 6 includes the subject matter of any one of Examples 1-5, wherein each key is coupled to a spring-like mechanism and to a mechanical frame within the housing.

Example 7 includes the subject matter of Example 6, wherein the spring-like mechanism is a scissor-switch mechanism.

Example 8 includes the subject matter of any one of Examples 1-7, further comprising conductive traces coupled to the housing and to the second conductive pads.

Example 9 includes the subject matter of Example 8, wherein the conductive traces comprise first traces arranged in rows and second traces arranged in columns, wherein the first traces and second traces are coupled to one another by second conductive pads at the intersection of the rows and columns.

Example 10 includes the subject matter of Example 9, further comprising circuitry to apply an electrical signal to the first traces and detect actuation of the plurality of keys based on signals received via the second traces.

Example 11 includes the subject matter of Example 9, further comprising circuitry to apply an electrical signal to the second traces and detect actuation of the plurality of keys based on signals received via the first traces.

Example 12 includes the subject matter of any one of Examples 1-11, wherein apparatus is a laptop computing device, the housing is a base portion of the laptop computing device, and the surface of the housing defining the holes is a C cover of the base.

Example 13 includes the subject matter of Example 12, wherein the apparatus further comprises a lid portion coupled to the base portion via a hinge.

Example 14 includes the subject matter of Example 12, comprising a processor and memory within the housing.

Example 15 includes the subject matter of any one of Examples 1-14, wherein the apparatus does not include a flexible printed circuit below the keys.

Example 16 is a computing device comprising: a lid; and a base coupled to the lid, the base comprising: a lower housing portion; and an upper housing portion coupled to the lower housing portion, the upper housing portion comprising a set of holes; a set of keys, each key disposed in a respective hole of the upper housing portion; wherein each key comprises a first conductive pad coupled to a bottom surface of the key, the upper housing portion comprises a second conductive pad on a surface defining each respective hole, and the set of keys are arranged such that the first conductive pad of the key contacts a corresponding second conductive pad when the key is actuated.

Example 17 includes the subject matter of Example 16, wherein each key comprises a portion extending away from a main body of the key and disposed under an overhanging portion of the housing that at least partially defines the hole, and wherein the first conductive pad is coupled to the portion of the key extending away from the main body of the key.

Example 18 includes the subject matter of Example 16, wherein each first conductive pad is on a lower surface of the key and each second conductive pad is on a surface of the housing disposed under the key.

Example 19 includes the subject matter of any one of Examples 16-18, wherein each key is coupled to a spring-like mechanism and to a mechanical frame within the housing.

Example 20 includes the subject matter of any one of Examples 16-19, further comprising: conductive traces coupled to the upper housing and to the second conductive pads; and circuitry to apply electrical signals to a first subset of the conductive traces and detect actuation of keys based on electrical signals received via a second subset of the conductive traces.

Example 21 includes the subject matter of Example 20, wherein the conductive traces comprise first traces arranged in rows and second traces arranged in columns, wherein the first traces and second traces are coupled to one another by second conductive pads at the intersection of the rows and columns.

Example 22 includes the subject matter of any one of Examples 16-21, wherein the lid and base are coupled via a hinge.

Example 23 includes the subject matter of any one of Examples 16-22, further comprising a display in the lid.

Example 24 includes the subject matter of any one of Examples 16-23, further comprising a processor and memory in the base.

Example 25 is a system comprising: a keyboard comprising: a housing; conductive traces coupled to a surface of the housing; a set of keys, each key comprising a conductive pad coupled thereto; and wherein actuation of a particular key causes the conductive pad coupled to the particular key to be in electrical connection with a conductive trace coupled to a surface of the housing; and circuitry coupled to the keyboard, the circuitry to receive signals from the conductive traces of the housing based on actuation of a key.

Example 26 includes the subject matter of Example 25, wherein each key comprises a portion extending away from a main body of the key and disposed under an overhanging portion of the housing that at least partially defines the hole, and wherein the conductive pad of the key is coupled to the portion of the key extending away from the main body of the key.

Example 27 includes the subject matter of Example 25, wherein each conductive pad is on a lower surface of the key and the housing comprises a surface disposed under the key that has a conductive pad disposed thereon that is connected to a conductive trace.

Example 28 includes the subject matter of any one of Examples 25-27, wherein each key is coupled to a spring-like mechanism and to a mechanical frame within the housing.

Example 29 includes the subject matter of any one of Examples 25-28, wherein the circuitry is to apply electrical signals to a first subset of the conductive traces and detect actuation of keys based on electrical signals received via a second subset of the conductive traces.

Example 30 includes the subject matter of Example 29, wherein the conductive traces comprise first traces arranged in rows and second traces arranged in columns, wherein the first traces and second traces are coupled to one another by second conductive pads at the intersection of the rows and columns.

The invention claimed is:

1. An apparatus comprising:

a housing comprising an upper portion and a lower portion, the upper portion defining a plurality of openings;

a plurality of keys, each key disposed in a respective opening in the upper portion of the housing;

a set of first conductive pads, each first conductive pad coupled to a respective key; and a set of second conductive pads, each second conductive pad coupled to a surface of the housing defining a respective opening in the upper portion;

wherein a first conductive pad of a key is not in contact with a second conductive pad of a hole corresponding to the key when the key is in a first position, and the first conductive pad of the key is in contact with the second conductive pad of the hole corresponding to the key when the key is in a second position.

2. The apparatus of claim 1, wherein the second position corresponds to actuation of the key.

3. The apparatus of claim 1, wherein the surfaces of the housing on which the second conductive pads are coupled are substantially parallel to the surfaces of the key on which the first conductive pads are coupled.

4. The apparatus of claim 1, wherein each key comprises a portion extending away from a main body of the key and disposed under an overhanging portion of the housing that at least partially defines the opening, and wherein the first conductive pad is coupled to the portion of the key extending away from the main body of the key.

5. The apparatus of claim 1, wherein each first conductive pad is on a lower surface of the key and each second conductive pad is on a surface of the housing disposed under the key.

6. The apparatus of claim 1, wherein each key is coupled to a spring-like mechanism and to a mechanical frame within the housing.

7. The apparatus of claim 6, wherein the spring-like mechanism is a scissor-switch mechanism.

8. The apparatus of claim 1, further comprising conductive traces coupled to the housing and to the second conductive pads.

9. The apparatus of claim 8, wherein the conductive traces comprise first traces arranged in rows and second traces arranged in columns, wherein the first traces and second traces are coupled to one another by second conductive pads at intersections of the rows and columns.

10. The apparatus of claim 9, further comprising circuitry to apply an electrical signal to the first traces and detect actuation of the plurality of keys based on signals received via the second traces.

11. The apparatus of claim 9, further comprising circuitry to apply an electrical signal to the second traces and detect actuation of the plurality of keys based on signals received via the first traces.

12. The apparatus of claim 1, wherein apparatus is a laptop computing device, the housing is a base portion of the laptop computing device, and the upper portion of the housing defining the openings is a C cover of the base.

13. A computing device comprising:

a lid; and a base coupled to the lid, the base comprising:

a lower housing portion;

an upper housing portion coupled to the lower housing portion, the upper housing portion defining a set of openings; and a set of keys, each key disposed in a respective opening of the upper housing portion;

wherein each key comprises a first conductive pad coupled to a bottom surface of the key, wherein the upper housing portion comprises a second conductive pad on a surface defining each respective opening, and the set of keys are arranged such that the first conductive pad of the key contacts a corresponding second conductive pad when the key is actuated.

14. The computing device of claim 13, wherein each key comprises a portion extending away from a main body of the key and disposed under an overhanging portion of the housing that at least partially defines the opening, and wherein the first conductive pad is coupled to the portion of the key extending away from the main body of the key.

15. The computing device of claim 13, wherein each first conductive pad is on a lower surface of the key and each second conductive pad is on a surface of the housing disposed under the key.

16. The computing device of claim 13, further comprising:

conductive traces coupled to the upper housing and to the second conductive pads; and circuitry to apply electrical signals to a first subset of the conductive traces and detect actuation of keys based on electrical signals received via a second subset of the conductive traces.

17. The computing device of claim 16, wherein the conductive traces comprise first traces arranged in rows and second traces arranged in columns, wherein the first traces and second traces are coupled to one another by second conductive pads at intersections of the rows and columns.

18. A system comprising:

a keyboard comprising:

a housing comprising an upper portion and a lower portion;

conductive traces coupled to a surface of the upper portion of the housing; and a set of keys, each key comprising a conductive pad coupled thereto;

wherein actuation of a particular key causes the conductive pad coupled to the particular key to be in electrical connection with a conductive trace coupled to the upper portion of the housing; and circuitry coupled to the keyboard, the circuitry to receive signals from the conductive traces of the housing based on actuation of a key.

19. The system of claim 18, wherein each key comprises a portion extending away from a main body of the key and disposed under an overhanging portion of the housing that at least partially defines an opening in which the key is positioned, and wherein the conductive pad of the key is coupled to the portion of the key extending away from the main body of the key.

20. The system of claim 18, wherein each conductive pad is on a lower surface of the key and the upper portion of the housing comprises a surface disposed under the key that has a conductive pad disposed thereon that is connected to a conductive trace.

* * * * *